Aug. 10, 1943.    J. GORRIEN    2,326,213
DEVICE FOR CONNECTING HOSE PIPES TO FAUCETS
Filed July 2, 1941

INVENTOR
JOHN GORRIEN
BY
J. H. Braddock
ATTORNEY

UNITED STATES PATENT OFFICE 2,326,213

DEVICE FOR CONNECTING HOSE PIPES TO FAUCETS

John Gorrien, Minneapolis, Minn., assignor to Clyde C. Needham, Minneapolis, Minn.

Application July 2, 1941, Serial No. 400,810

3 Claims. (Cl. 285—108)

This invention has relation to a device for connecting hose pipes to faucets.

An object of the invention is to provide a device of the present character which will be of novel and improved construction.

A further object is to provide a simple and inexpensive device for connecting hose pipes to faucets wherein will be incorporated various improved features and characteristics of construction which will be novel both as individual entities of the device and in combination with each other.

And a further object is to provide a device for connecting hose pipes to faucets of structure as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Figure 1:
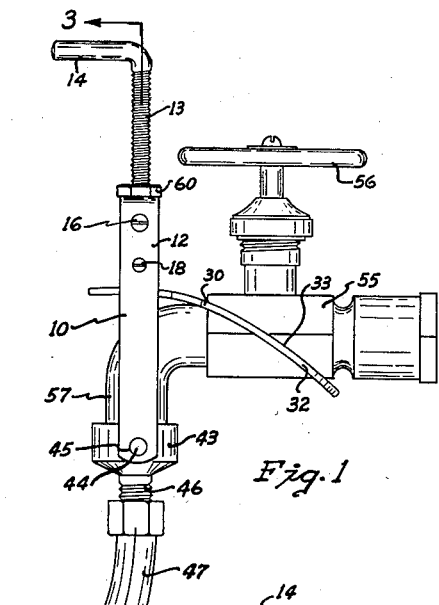
Fig. 1 is a side elevational view of a device made according to the invention as when applied to use.
Figure 2:
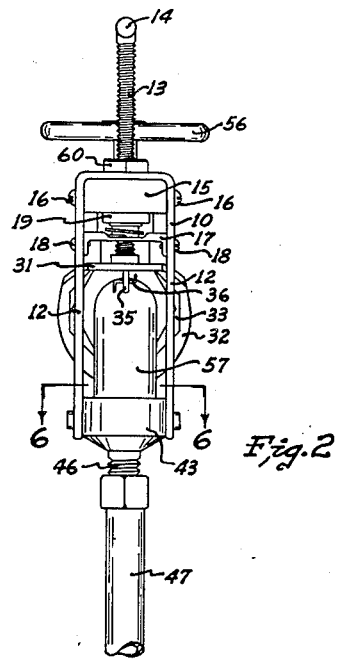
Fig. 2 is an end elevational view of the device as it would appear from the left of the disclosure of Fig. 1.
Figure 3:
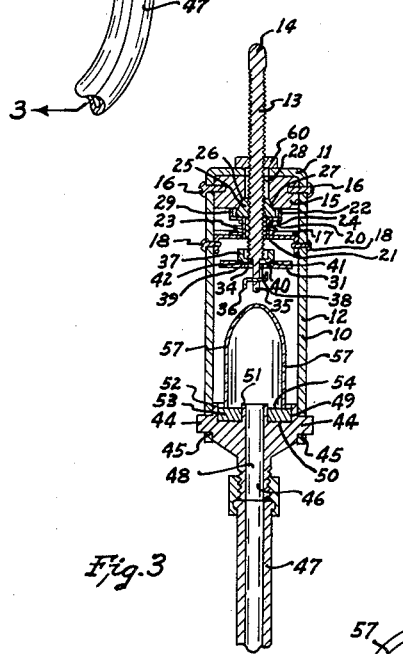
Fig. 3 is a sectional view, taken on line 3—3 in Fig. 1.
Figure 4:
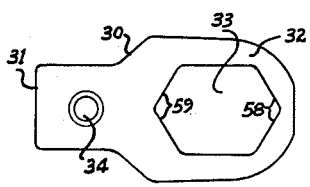
Fig. 4 is a top plan view of the saddle of the device.
Figure 5:
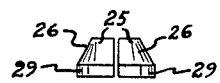
Fig. 5 is a detail view of the split nut.

With respect to the drawing and the numerals of reference thereon, a yoke 10 of the device is constituted as an inverted generally U-shape member of metal or other rigid material including a base 11 and spaced apart arms 12, 12 of said U-member. As disclosed, the metal or material comprising the base 11 lies in a single plane, as does also the metal or material comprising each of the arms 12, 12, and said arms 12, 12 are in perpendicular relation to said base 11.

A clamping screw of the device is denoted generally at 13, and a manipulating handle for said clamping screw is indicated at 14.

An upper retainer 15 is constituted as a rectilinear block of metal or other rigid material situated between the arms 12, 12 in contiguous relation to the base 11 of the U-member yoke 10. Fastening screws 16, one in each of the arms 12 and entering the adjacent end of the upper retainer or rectilinear block 15, fixedly secure said upper retainer or block within said U-member yoke.

A cross member or seat member 17 is constituted as a blank of metal or other rigid material situated between the arms 12, 12 and disposed in slightly spaced relation to the upper retainer or block 15, beneath said upper retainer or block. Fastening screws 18, one in each of the arms 12 and entering the adjacent end of the cross member or seat member 17, fixedly secure said cross member or seat member within the U-member yoke.

A lower retainer 19 is constituted as a tubular element of metal or other rigid material situated between the upper retainer or block 15 and the cross member or seat member 17. A lower reduced portion 20 of the tubular lower retainer 19 is slidably disposed in an opening 21 through said cross member or seat member 17, and an upper enlarged portion 22 of said tubular lower retainer is resiliently urged toward and against the lower surface of the upper retainer or block 15 by a coil spring 23 in surrounding relation to the lower reduced portion 20 and seated between the cross member or seat member 17 and an annular portion 24 of the lower retainer which connects said lower reduced portion 20 and the upper enlarged portion 22 of said lower retainer with each other. As disclosed, the annular portion 24 is in perpendicular relation to the lower and upper portions 20 and 22 of the lower retainer 19.

A split nut 25 situated between the upper retainer 15 and the lower retainer 19 includes a conical upper portion 26 thereof slidably disposed within a conical opening 27 of said upper retainer beneath a passageway 28 through the upper retainer and the base 11, and an annular lower portion 29 thereof loosely seated within the upper enlarged portion 22 of said lower retainer 19 adjacent the annular portion 24 of the lower retainer.

The passageway 28 and the opening 21 are in alinement with each other and with the split nut 25, and the clamping screw 13 is disposed within and passes through said passageway 28, the lower retainer 19 and said split nut 25. The construction and arrangement are such that the coil spring 23 normally urges the lower retainer 19 upwardly to cause the conical upper portion 26 of the split nut 25 to be seated in the conical opening 27 and said split nut to be operatively engaged with the clamping screw 13 so that said clamping screw will upon being rotated move longitudinally, or upwardly or downwardly, as the case may be. It will be evident, however, that the clamping screw can be forcibly moved downwardly. That is, said clamping screw can be moved downwardly by application of force thereto in direction longitudinally of the clamping screw. The application of downward force will cause the lower retainer 19 to be moved downwardly against the resilient action of the coil spring 23, thus to permit the split nut to become released from engaging relation with the clamping screw. Stated otherwise, a downward push upon said clamping screw relatively to the yoke 10 will, through the instrumentality of the split nut, cause the lower retainer 19 to be moved toward the cross member or seat member 17 thus to permit release of said split nut from the clamping screw.

A saddle 30 is constituted as an elongated strip or piece of metal or other rigid material which is as disclosed slightly curved in the direction of its length. An inner end portion 31 of the saddle 30 is freely disposed between the arms 12, 12 of the U-member yoke 10, and an outer end portion 32 of said saddle includes an opening 33, of some considerable area, for a purpose to be set forth. As shown, the opening 33 is of greater dimension in direction longitudinally of the saddle 30 than in direction transversely of said saddle.

The inner end portion 31 of said saddle 30 includes an opening 34, desirably at the midwidth of said inner end portion 31, adapted to freely receive a reduced extension 35 rigid or integral with the lower end of the clamping screw 13, and means 36, such as a cotter pin, or equivalent, is situated in said reduced extension 35 at the side of the saddle 30 opposite said clamping screw 13 to preclude the possibility of accidental removal of said inner end portion 31 from the reduced extension 35.

A thrust element 37 upon said reduced extension 35 and between the clamping screw 13 and the inner end portion 31 of the saddle 30 is constituted as a cup-shape member including a base 38 adapted to become engaged against the inner end portion 31 of the saddle 30 at location surrounding the opening 34. Said base 38 includes an opening 39 through which said reduced extension 35 freely passes, and the construction and arrangement are such that the clamping screw 13 with its reduced extension 35 can be rotated relatively to the thrust element 37 while an annular shoulder 40, in surrounding relation to the inner end of said reduced extension 35, of said clamping screw bears against the upper surface of the base 38 of said thrust element 37 thus to cause a circumferential bevel surface 41 at the lower side of said base 38 to engage against a circumferential bevel surface 42 in surrounding relation to the opening 34 at the upper side of said inner end portion 31 of the saddle 30.

Figure 6:
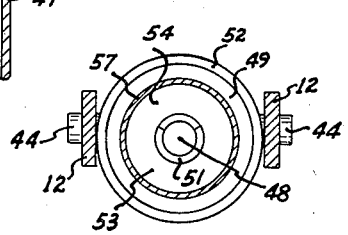
Fig. 6 is a detail sectional view, taken on line 6—6 in Fig. 2.

A stopple or stopple element 43 is constituted as an annular member of metal or other rigid material situated between the lower or outer end portions of the arms 12, 12 of the U-member yoke 10 and pivotally or rotatably supported by said arms. More explicitly, the stopple or stopple element 43 includes substantially oppositely disposed trunnion pins 44 mounted in trunnion holes 45 in the arms 12. As disclosed, the trunnion pins 44 are situated slightly closer to the side of the stopple or stopple element 43 which is adjacent the outer end portion 32 of the saddle 30, as very clearly disclosed in Figs. 1 and 6.

The portion of the annular stopple or stopple element 43 at the lower or outer side of the trunnion pins 44 includes a threaded nipple 46 for the ready reception of a hose 47, and a fluid conveying port 48 extends, desirably centrally, through said stopple or stopple element and its threaded nipple.

The portion of the annular stopple or stopple element at the upper or inner side of said trunnion pins 44 is constructed to provide an upwardly or inwardly opening concavity 49, which is annular as disclosed, bounded at its base by an annular flat surface 50 defined by the body of said stopple or stopple element and disposed in surrounding relation to a part-circular protuberance 51 which itself surrounds the port 48 and extends upwardly from or inwardly of the annular flat surface 50, and bounded at its side or sides by an annular flange 52 of the stopple or stopple element which extends upwardly of or inwardly from said body of the stopple or stopple element and is in surrounding relation to said annular flat surface 50. The upper or inner end of the part-circular protuberance 51 terminates flush with the upper or inner end of the annular flange 52 as disclosed, and an annular gasket or faucet sealing member 53 is situated within the concavity 49 in snug surrounding relation to the part-circular protuberance 51 and in snug engaging relation with the annular flange 52. A flat surface of the annular gasket or faucet sealing member 53 which is adjacent the body of the stopple or stopple element 43 is firmly seated against the annular flat surface 50, and a flat surface 54 of said annular gasket or faucet sealing member which is opposite said stopple or stopple element is within the confines of the concavity 49 in the disclosure as made.

An ordinary faucet or tap is represented at 55, and a hand piece for operating said faucet or tap is indicated at 56.

The manner in which the device is applied to use to connect a hose pipe to a faucet will be apparent from the drawing. The saddle 30 is adapted to be assembled with a faucet by passing the opening 33 in the outer end portion 32 of said saddle upwardly about the outlet member, such as denoted at 57, of the faucet and causing the edge portion or edge portions 58 defining the outer end of said opening 33 to be engaged firmly against a lower surface or surfaces of said faucet and the edge portion or edge portions 59 defining the inner end of the opening 33 to rest firmly upon an upper surface or surfaces of the faucet, about as disclosed. Of course, the clamping screw 13 will be placed at a receded adjusted position so that the saddle will be situated at sufficient distance from the stopple or stopple element 43 to cause said stopple or stopple element to be disposed in spaced relation to the outlet end of the faucet outlet member such as 57, below the elevation of said outlet end, during the operation of assembly of said saddle 30 with a faucet. After the saddle is assembled with a faucet, in the manner as set forth, the stopple or stopple element will be caused to aline with the outlet member of the faucet, and the clamping screw 13 will then be forced downwardly thus to cause said stopple or stopple element and the annular gasket or faucet sealing member 53 to move toward each other so that said annular gasket or faucet sealing member is drawn up against the mouth of the faucet outlet member, as very clearly disclosed in the drawing. To cause said gasket or member 53 to be engaged against the mouth of the faucet outlet member under considerable pressure, after the clamping screw has been forced down to lift the stopple or stopple element to position where its gasket or sealing member is contiguous with the mouth of the faucet, said clamping screw will be rotated in direction to cause said stopple or stopple element and the saddle to move, or have tendency toward moving, farther toward each other, as will be understood.

A lock nut 60 upon the clamping screw 13 may be turned down against the base 11 of the U-member yoke 10 when it is desired to insure a set position of said clamping screw in the device.

It will be apparent that upon the tightening up of the stopple or stopple element 43 against the mouth of the outlet end of a faucet there will be tendency toward swinging movement of said stopple or stopple element in direction away from the saddle 30, to the left in Fig. 1, as well as tendency of the stopple or stopple element to rotate in clockwise direction in said Fig. 1. Both of these tendencies are met and overcome by situating the trunnion pins 44 off center with respect to said stopple or stopple element at the side thereof adjacent said saddle so that the force exerted to cause the saddle and stopple element to move toward each other will be exerted in a direction substantially perpendicular to the flat surface 54 of the annular gasket or faucet sealing member 53, or at least in a direction closer to 90 degrees than would be the case were the trunnion pins situated at the diameter of said stopple or stopple element.

The part-circular protuberance 51 evidently constitutes means of the device for more ready association of the stopple or stopple element with a faucet.

Attention is called to the fact that inasmuch as the inner end portion 31 of the saddle 30 is freely received upon the reduced extension 35, the U-member yoke 10 is capable of swinging adjustment relatively to said saddle, and in any instance where the stopple or stopple element 43 may be out of alinement with the faucet outlet member when the saddle is applied, said stopple or stopple element may easily be brought to alinement by swinging or rocking said yoke relatively to said saddle. Evidently, the annular gasket or faucet sealing member 53 and the arms 12 of the yoke need not be at right angle relation when the device is applied to use. That is, the trunnion pins 44 permit swinging adjustment or movement of said gasket or member 53 relatively to said arms, and the annular gasket or faucet sealing member will become properly seated against the mouth of the outlet end of a faucet no matter what the relative positions, within limits, of said arms 12 and said gasket or member 53.

Also, attention is called to the fact that when the clamping screw 13 is turned to its farthest receded position, so that the thrust element 37 engages against the lower surface of the cross member or seat member 17, there can be no locking or "freezing" action upon the clamping screw. Instead, an amount of turning force short of that required to cause a locking or "freezing" action upon the clamping screw will cause the split nut to rotate with said clamping screw in the upper and lower retainers 15 and 19. However, when the clamping screw is rotated to move the saddle downwardly and the stopple or stopple element upwardly, during the gripping of the device upon a faucet, the split nut evidently will receive the thrust thus to be pressed against the wall of the conical opening 27 and retained against turning movement.

What is claimed is:

1. A device of the character described, comprising a yoke member having spaced apart, oppositely disposed arms, a saddle having a portion thereof disposed at a side of said yoke member arms adapted to be rigidly supported upon the body of a faucet, a split nut, means disposed between said yoke member arms supporting said split nut, a clamping screw assembled with said split nut and engaged with said saddle, a stopple element pivotally supported between said yoke member arms and disposed in spaced relation to said saddle, and means for permitting said split nut to become released from said clamping screw upon the application of force to the clamping screw in direction adapted to cause said clamping screw to be moved relatively to said yoke member in direction toward said stopple element.

2. A device of the character described, comprising a yoke member having spaced apart, oppositely disposed arms, a saddle having a portion thereof disposed at a side of said yoke member arms adapted to be rigidly supported upon the body of a faucet, a split nut, means disposed between said yoke member arms supporting said split nut, a clamping screw assembled with said split nut and loosely engaged with a portion of said saddle adjacent said yoke member, a stopple element pivotally supported between said yoke member arms and disposed at a side of the saddle in spaced relation thereto, and means for permitting said split nut to become released from said clamping screw upon the application of force to the clamping screw in direction adapted to cause said clamping screw to be moved relatively to said yoke member toward said stopple element.

3. A device of the character described, comprising a yoke member having spaced apart, oppositely disposed arms, a saddle having a portion thereof disposed at a side of said yoke member arms adapted to be rigidly supported upon the body of a faucet, a split nut, means disposed between said yoke member arms supporting said split nut, a clamping screw assembled with said split nut and loosely engaged with said saddle, a stopple element disposed in spaced relation to said saddle at a side of the saddle, means situated at a side of the diameter of the stopple element adjacent the saddle pivotally supporting said stopple element between the arms of said yoke member, and means for permitting said split nut to become released from said clamping screw upon the application of force to the clamping screw in direction adapted to cause said clamping screw to be moved relatively to said yoke member toward said stopple element.

JOHN GORRIEN.